United States Patent
Shin

(10) Patent No.: US 9,732,276 B2
(45) Date of Patent: *Aug. 15, 2017

(54) ALIGNMENT LAYER AND LIQUID CRYSTAL DISPLAY HAVING THE SAME

(71) Applicant: SAMSUNG DISPLAY CO., LTD., Yongin, Gyeonggi-Do (KR)

(72) Inventor: Ki-Chul Shin, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 79 days.

This patent is subject to a terminal disclaimer.

(21) Appl. No.: 14/206,185

(22) Filed: Mar. 12, 2014

(65) Prior Publication Data

US 2014/0192306 A1  Jul. 10, 2014

Related U.S. Application Data

(63) Continuation of application No. 11/981,281, filed on Oct. 30, 2007, now Pat. No. 8,704,985.

(30) Foreign Application Priority Data

Nov. 2, 2006 (KR) .......................... 10-2006-0107936

(51) Int. Cl.
| | |
|---|---|
| *C09K 19/56* | (2006.01) |
| *C08L 79/08* | (2006.01) |
| *C09K 19/34* | (2006.01) |
| *G02F 1/1337* | (2006.01) |
| *C09K 19/04* | (2006.01) |

(52) U.S. Cl.
CPC .............. *C09K 19/56* (2013.01); *C08L 79/08* (2013.01); *C09K 19/3452* (2013.01);
(Continued)

(58) Field of Classification Search
None
See application file for complete search history.

(56) References Cited

U.S. PATENT DOCUMENTS

| | | | |
|---|---|---|---|
| 6,645,579 B1 | 11/2003 | Tsuboyama et al. | |
| 2005/0140837 A1* | 6/2005 | Crawford | G02F 1/133788 349/42 |

(Continued)

FOREIGN PATENT DOCUMENTS

KR  1020030022431 A  3/2003

OTHER PUBLICATIONS

Klaus Weiss, et al., "Molecular Orientation at Rubbed Polyimide Surfaces Determined with X-ray Absorption Spectroscopy: Relevance for Liquid Crystal Alignment", 1998 American Chemical Society, Macromolecules 1998, 31, pp. 1930-1936, Published on Web Feb. 28, 1998.

(Continued)

*Primary Examiner* — Anthony J Frost
(74) *Attorney, Agent, or Firm* — Innovation Counsel LLP

(57) ABSTRACT

Disclosed are an alignment layer and a liquid crystal display having the same. The alignment layer comprises a polyimide compound having an azo group and exhibiting optical alignment characteristics and a discotic liquid crystal compound exhibiting optical anisotropy. The liquid crystal display comprises first and second substrates facing each other, liquid crystal aligned between the first and second substrates, and an alignment layer formed on at least one surface of the first and second substrates. The alignment layer is adjacent to the liquid crystal and has optical alignment characteristics and optical anisotropy.

20 Claims, 5 Drawing Sheets

(52) U.S. Cl.
CPC .. *G02F 1/133723* (2013.01); *B32B 2457/202* (2013.01); *C08L 2205/02* (2013.01); *C09K 2019/0429* (2013.01); *C09K 2019/0448* (2013.01); *G02F 2001/133726* (2013.01); *G02F 2413/10* (2013.01); *Y10T 428/1005* (2015.01); *Y10T 428/1023* (2015.01); *Y10T 428/1055* (2015.01)

(56) References Cited

U.S. PATENT DOCUMENTS

| | | | | |
|---|---|---|---|---|
| 2006/0040131 | A1* | 2/2006 | Klubek | C09K 11/06 428/690 |
| 2006/0083868 | A1* | 4/2006 | Sawatari | C09K 19/0225 428/1.3 |
| 2006/0280880 | A1* | 12/2006 | Park | G02F 1/133784 428/1.1 |

OTHER PUBLICATIONS

J.H. Park, et al., "Synthesis and Characterization of Novel Polyimides Containing Stilbene Unit in the Side Chain and Their Controllability of Nematic Liquid Crystal Alignment on the Rubbed Surfaces", Journal of Polymer Science: Part A: Polymer Chemistry, vol. 39, pp. 3622-3232 (2001).

Roland Meister, et al., "The Conformation of a Rubbed Polyimide", 1999 American Chemical Society, Macromolecules 1999, 32, pp. 480-486, Published on Web Dec. 29, 1998.

\* cited by examiner

US 9,732,276 B2

ALIGNMENT LAYER AND LIQUID CRYSTAL DISPLAY HAVING THE SAME

CROSS-REFERENCE TO RELATED APPLICATION

This application is a continuation application of U.S. patent application Ser. No. 11/981,281 filed on Oct. 30, 2007, which claims priority to Korean Patent Application No. 10-2006-107936 filed on Nov. 2, 2006, in the Korean Intellectual Property Office (KIPO), and all the benefits accruing therefrom under 35 U.S.C. §119, the contents of the prior applications being herein incorporated by reference.

BACKGROUND OF THE INVENTION

1. Field of the Invention

The present invention relates to an alignment layer and a liquid crystal display having the same. More particularly, the present invention relates to an alignment layer having optical alignment characteristics and a liquid crystal display capable of widening a viewing angle by using the alignment layer.

2. Description of the Related Art

A liquid crystal display displays an image by using liquid crystal. The liquid crystal display includes a liquid crystal panel that includes two substrates and a liquid crystal layer interposed between the two substrates. The liquid crystal is aligned in the liquid crystal layer, and the liquid crystal has a refractive anisotropy so that the transmittance of the light passing through the liquid crystal layer varies according to the alignment direction of the liquid crystal.

The alignment direction of the liquid crystal is adjusted by an alignment layer formed on the two substrates. In order to adjust the alignment direction of the liquid crystal, a rubbing process is performed. That is, a roller covered with cloth is rolled over the alignment layer to rub the alignment layer with the cloth. However, the rubbing force may be non-uniform according to the position of the alignment layer during the rubbing process, so the liquid crystal may be irregularly aligned.

Because the liquid crystal has the refractive anisotropy, the quality of the image displayed in the liquid crystal display varies according to the direction of the viewer. In general, the viewer usually watches the image in front of the liquid crystal display, so the liquid crystal display is operated to display the high quality image in the frontal direction. However, as the viewer moves to the side of the liquid crystal display, the image becomes distorted so that the image quality is degraded. Thus, the liquid crystal display has a viewing angle, which is a range of angles allowing the viewer to view the image clearly, narrower than that of other display apparatuses.

SUMMARY OF THE INVENTION

Therefore, the present invention provides an alignment layer which optically aligns liquid crystal to widen a viewing angle.

The present invention also provides a liquid crystal display having the alignment layer.

In one aspect, an alignment layer comprises a first polyimide compound which is formed from a discotic liquid crystal compound and a second polyamide compound having an azo group.

In another aspect, a liquid crystal display comprises first and second substrates facing each other, liquid crystal aligned between the first and second substrates and an alignment layer formed on at least one surface of the first and second substrates which are adjacent to the liquid crystal. The alignment layer comprises a first polyimide compound which is formed from a discotic liquid crystal compound and a second polyimide compound having an azo group.

BRIEF DESCRIPTION OF THE DRAWINGS

The above and other advantages of the present invention will become readily apparent by reference to the following detailed description when considered in conjunction with the accompanying drawings wherein.

DESCRIPTION OF THE EMBODIMENTS

Figure 1:
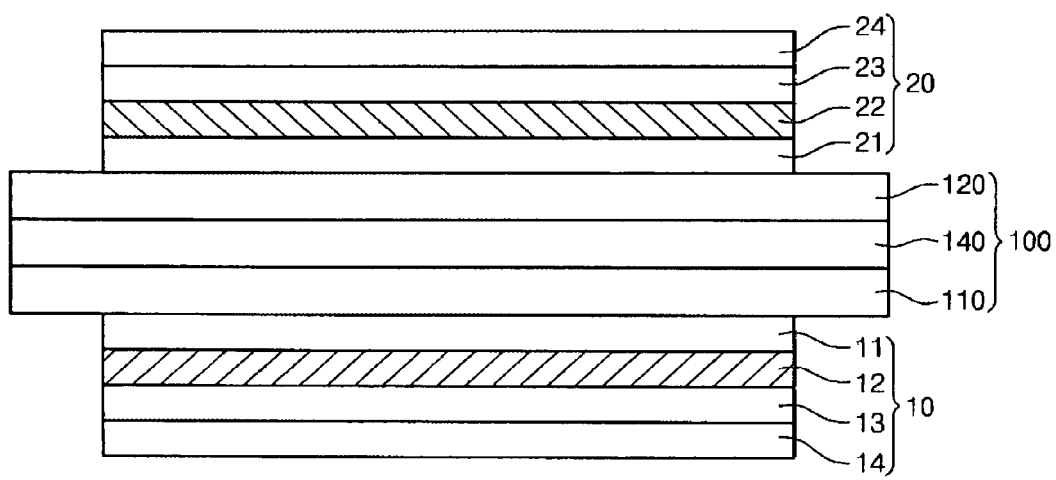
FIG. 1 is a sectional view illustrating a liquid crystal display according to an embodiment of the present invention.

Hereinafter, embodiments of the present invention will be explained in detail with reference to the accompanying drawings. However, the scope of the present invention is not limited to such embodiments and the present invention may be realized in various forms. The embodiments to be described below are nothing but the ones provided to bring the disclosure of the present invention to perfection and assist those skilled in the art to completely understand the present invention. The present invention is defined only by the scope of the appended claims. In addition, the size of regions shown in the drawings can be simplified or magnified for the purpose of clear explanation and may not be necessarily drawn to scale. Also, the same reference numerals are used to designate the same elements throughout the drawings.

FIG. 1 is a sectional view illustrating a liquid crystal display according to an embodiment of the present invention.

Referring to FIG. 1, first and second polarizers 10 and 20, and a liquid crystal panel 100 are provided. The liquid crystal panel 100 includes first and second substrates 110 and 120 that are facing each other, and a liquid crystal layer 140 interposed between the first and second substrates 110 and 120. The first polarizer 10 is attached to the first substrate 110 of the liquid crystal panel 100, and the second polarizer 20 is attached to the second substrate 120 of the liquid crystal panel 100.

The first polarizer 10 includes a first supporting film 11, a first polarizing film 12, a second supporting film 13 and a first protecting film 14. The first polarizing film 12 has a transmission axis in one direction, and linearly polarizes incident light in a parallel direction to the transmission axis. The first and second supporting films 11 and 13 are attached to both surfaces of the first polarizing film 12, respectively, to support the first polarizing film 12. The first protecting film 14 is attached to the second supporting film 13 at the outermost side of the first polarizer 10 to protect the other films.

The second polarizer 20 has a structure corresponding to the first polarizer 10. The second polarizer 20 includes a second polarizing film 22 that has the transmission axis perpendicular to that of the first polarizing film 12. Third and fourth supporting films 21 and 23 are attached to both surfaces of the second polarizing film 22, and a second protecting film 24 is attached to the top surface of the fourth supporting film 23.

Figure 2:
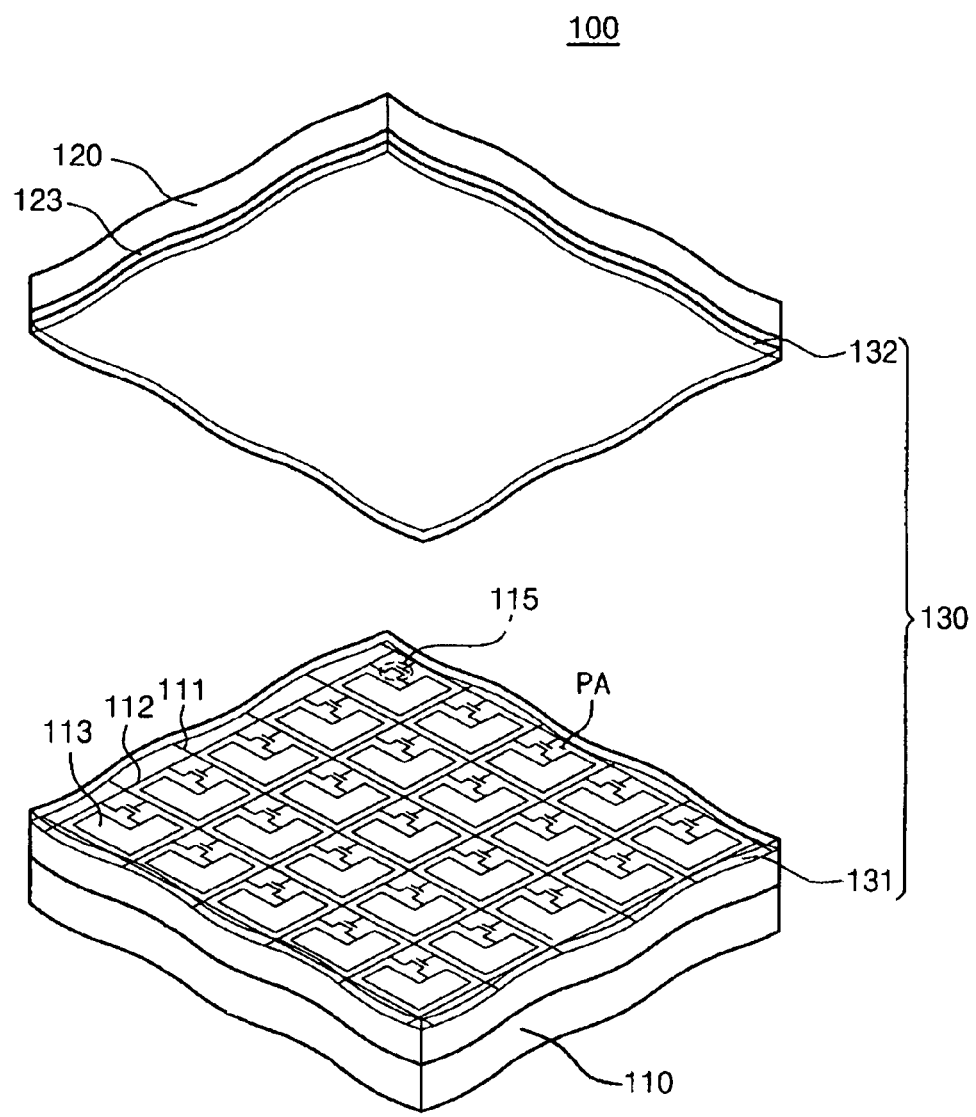
FIG. 2 is an enlarged perspective view illustrating a part of a liquid crystal panel shown in FIG. 1.

FIG. 2 is an enlarged perspective view illustrating a part of a liquid crystal panel shown in FIG. 1.

Referring to FIG. 2, a plurality of gate lines 111 and data lines 112 are formed on the first substrate 110. The gate lines 111 cross the data lines 112 to define pixel areas PA. Each pixel area includes a pixel electrode 113 and a thin film transistor 115. The second substrate 120 includes a common electrode 123 facing the pixel electrode 113. First and second alignment layers 131 and 132 are formed on the pixel electrode 113 and the common electrode 123, respectively, while facing each other.

Hereinafter, the operation of the liquid crystal display will be described with reference to FIGS. 1 and 2.

Liquid crystal is aligned in the liquid crystal layer 140. The liquid crystal has an oval shape having a long-axis and a short-axis, and an alignment direction thereof is defined by the direction of the long-axis. When voltage is not applied to the pixel electrode 113 and the common electrode 123 during the operation of the liquid crystal display, the liquid crystal is aligned parallel to the first and second substrates 110 and 120. In addition, the liquid crystal on the first substrate 110 and the liquid crystal on the second substrate 120 are perpendicular to each other, and the liquid crystal between the two substrates is continuously twisted. With such a state, light is supplied and is linearly polarized as it passes through the first polarizer 10. As the linearly polarized light passes through the liquid crystal layer 140, the phase thereof changes according to the twisted liquid crystal. The phase changed light passes through the second polarizer 20 to display the image.

Data voltage is applied to the pixel electrode 113 during the operation of the liquid crystal display. In addition, a common voltage is applied to the common electrode 123. An electric field derived from the voltage difference between the data voltage and the common voltage is established between the first and second substrates 110 and 120. The liquid crystal has a dielectric anisotropy, and the liquid crystal is aligned perpendicular to the first and second substrates 110 and 120 as the electric field is applied thereto. With such a state, the light is supplied and the light is linearly polarized as it passes through the first polarizer 10. The linearly polarized light is not subject to the phase change while passing through the liquid crystal layer 140, so the light does not pass through the second polarizer 20. Thus, the liquid crystal display becomes a black state.

The liquid crystal may be inclined relative to the first and second substrates 110 and 120 according to the intensity of the electric field applied thereto. The phase change of the light is incurred according to the inclination angle, and some light passes through the second polarizer 20 so that the image having a gray scale may be displayed.

In such an operation, the alignment direction of the liquid crystal is adjusted by the first and second alignment layers 131 and 132 when the electric field is not applied to the liquid crystal. The first and second alignment layers 131 and 132 have optical alignment characteristics through a photo-isomerization reaction. The first and second alignment layers 131 and 132 include a polyimide compound having an azo group in order to have the optical alignment characteristics.

The polyimide is a polymer compound having an imide group (CO—N—CO), and represents superior stability, durability and productivity. The azo group (N=N) includes double-bonded nitrogen atoms, and has trans/cis isomers due to the double-bonded nitrogen atoms. The isomers exhibit the photo-isomerization reaction which is the interconversion between the trans/cis isomers by the light. The liquid crystal can be aligned in a desired direction through the photo-isomerization reaction.

A compound represented by chemical formula 1 as follows can be used as the polyimide compound having the azo group.

<Chemical formula 1>

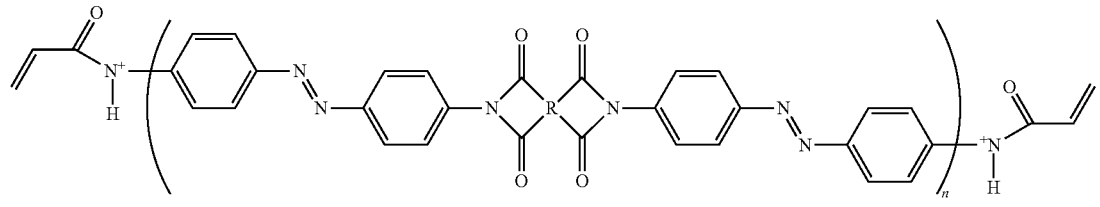

R: hydrocarbon n: positive integer

The compound of chemical formula 1 is a polymer compound having central hydrocarbon that is capped with an imide group and azobenzenoid, and has acrylic groups

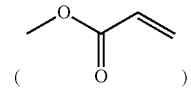

bonded to the terminal ends thereof.

Figure 3:
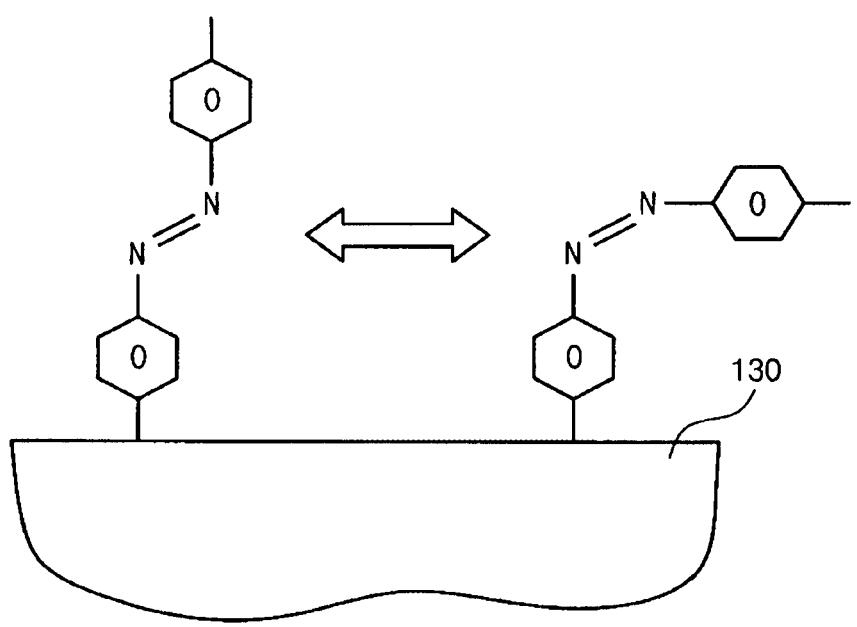
FIG. 3 is a view illustrating the process of interconversion between trans-azobenzenoid and cis-azobenzenoid by the light in an alignment layer shown in FIG. 2.

FIG. 3 is a view illustrating the process of interconversion between trans-azobenzenoid and cis-azobenzenoid by the light in an alignment layer shown in FIG. 2.

Referring to FIG. 3, the azobenzenoid is more stable in the trans isomer than the cis isomer. The trans-azobenzenoid chain is aligned perpendicular to the alignment layer 130. The light is supplied to the entire surface of the alignment layer 130 such that the trans-azobenzenoid absorbs the light. Then, the trans-azobenzenoid is converted into the cis-azobenzenoid through the photo-isomerization reaction. The cis-azobenzenoid chain is aligned parallel to the alignment layer 130. Since the cis-azobenzenoid is unstable, it is immediately converted into the trans-azobenzenoid by a thermal excitation, so that azobenzenoid can be aligned in the direction perpendicular to the alignment layer 130. In this case, the azobenzenoid does not absorb light and can be stabilized.

Through such a process, the alignment layer including the azobenzenoid has a stronger structure, in which the mobility of liquid crystal is reduced as compared with the state before the alignment layer is stabilized. Therefore, the alignment layer 130 imposes a strong elasticity to the liquid crystal, and the liquid crystal can be aligned in the direction perpendicular to the alignment layer 130 according to the direction of the trans-azobenzenoid.

Meanwhile, the light can be supplied to the alignment layer 130 while forming a specific angle relative to the alignment layer 130. In this case, the azobenzenoid can be converted into the trans isomer to be stabilized through the photo-isomerization reaction, in which the trans isomer is inclined relative to the alignment layer 130 at a specific angle. The liquid crystal is inclined according to the direction of the inclined trans-azobenzenoid. The liquid crystal can be horizontally aligned at a specific linear inclination angle by adjusting the incident angle of the light.

The alignment layer 130 can have alignment characteristics through a rubbing process as well as supplying the light thereto. That is, a roller covered with cloth is rolled over the alignment layer 130 to rub the alignment layer 130 with the cloth such that the alignment layer 130 may have the alignment characteristics. However, the rubbing force may be non-uniform according to the position of the alignment layer during the rubbing process, so the liquid crystal may be irregularly aligned. In contrast, the light can be uniformly supplied on the entire surface of the alignment layer 130 through the process of forming the alignment by the light, so the process according to the present embodiment is more efficient than the rubbing process.

The alignment layer 130 according to the present embodiment has an optical anisotropy as well as the optical alignment characteristics, and the viewing angle of the liquid crystal display is widened by such characteristics of the alignment layer 130.

Figure 4A:
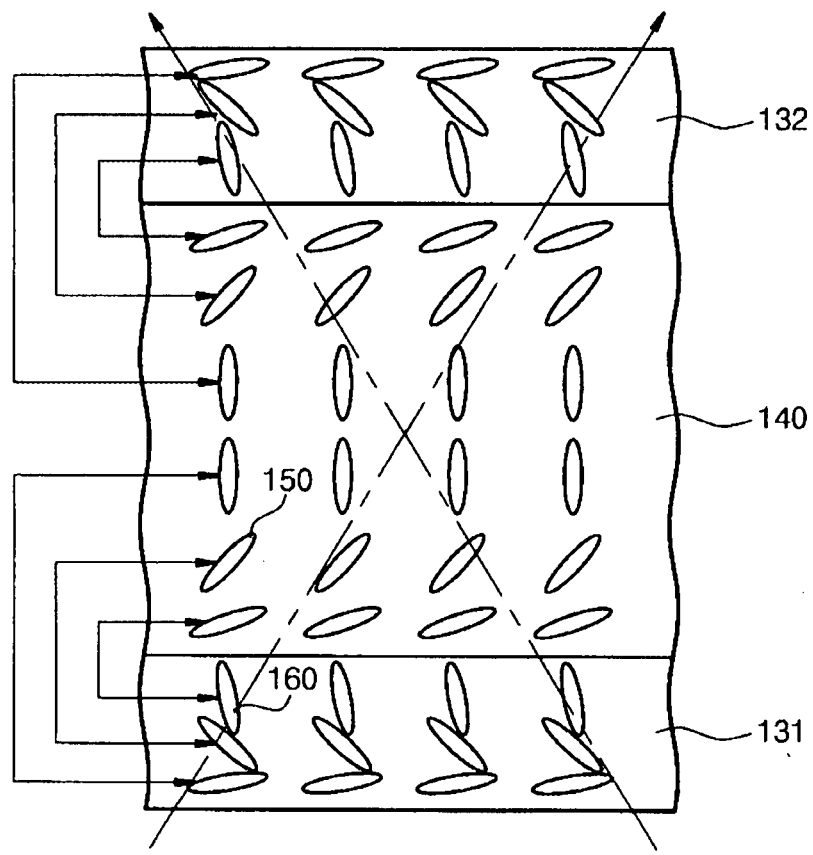
FIG. 4A is a view illustrating the process of widening a viewing angle in an alignment layer and a liquid crystal layer shown in FIG. 2.
Figure 4B:
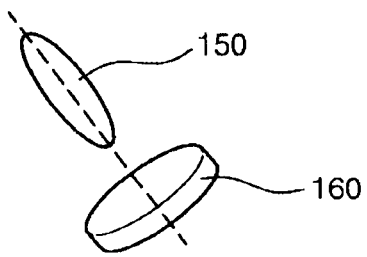
FIG. 4B is a view illustrating the principle of compensation for a phase difference between nematic liquid crystal and discotic liquid crystal shown in FIG. 4A.

FIG. 4A is a view illustrating the process of widening a viewing angle in an alignment layer and a liquid crystal layer shown in FIG. 2, and FIG. 4B is a view illustrating the principle of compensation for a phase difference between nematic liquid crystal and discotic liquid crystal shown in FIG. 4A.

Referring to FIG. 4A, the alignment layer 130 includes discotic liquid crystal 160 having the optical anisotropy. Various liquid crystals may be used in the liquid crystal layer 140 according to the operational procedure of the liquid crystal display. For instance, nematic liquid crystal 150 corresponding to the discotic liquid crystal 160 may be used. The nematic liquid crystal 150 has a bar shape, and the discotic liquid crystal 160 has a disk shape.

The liquid crystal layer 140 includes a twisted structure in which the nematic liquid crystal 150 is positioned between the first and second alignment layers 131 and 132 and the alignment direction of the nematic liquid crystal 150 is twisted. In this case, the image may be distorted at a lateral direction which means an inclined direction with regard to the second alignment layer 132 due to a refractive anisotropy of the nematic liquid crystal 150. However, the distortion of the image in the lateral direction can be prevented by the discotic liquid crystal 160.

Referring to FIG. 4B, the nematic liquid crystal 150 is a positive uniaxial medium having the bar shape, so it has an extraordinary refractive index larger than an ordinary refractive index. The discotic liquid crystal 160 is a negative uniaxial medium having the disk shape, so it has an extraordinary refractive index smaller than an ordinary refractive index. Therefore, as shown in FIG. 4B, if the nematic liquid crystal 150 and the discotic liquid crystal 160 are aligned parallel to the traveling direction of the light, the phase difference according to the traveling direction of the light can be compensated.

As shown in FIG. 4A, the nematic liquid crystal 150 is continuously twisted in the liquid crystal layer 140. The twisted degree varies according to the vertical location of the nematic liquid crystal 150 in the liquid crystal layer 140. The discotic liquid crystals 160 are aligned such that it corresponds to each of the nematic liquid crystal 150 having different twisted degrees. When dividing the liquid crystal layer 140 into two portions in the parallel direction, the discotic liquid crystals 160 in the first alignment layer 131 correspond to the nematic liquid crystals 150 in the lower portion of the liquid crystal layer 140, and the discotic liquid crystals 160 in the second alignment layer 132 correspond to the nematic liquid crystals 150 in the upper portion of the liquid crystal layer 140.

As described above, the alignment layer 130 includes a discotic liquid crystal compound, so the image quality is improved in the lateral direction. As a result, the viewing angle of the liquid crystal display is widened. A separate film may be made by using the discotic liquid crystal compound, and the film can be included in the first and second polarizers 10 and 20. In this case, the viewing angle of the liquid crystal display can also be widened, but the separate film must be manufactured. Thus, the method of the present embodiment employing the alignment layer 130 is more efficient than the process employing the separate film.

A compound represented by chemical formula 2 as follows can be used as the compound of the discotic liquid crystal 160.

<Chemical formula 2>

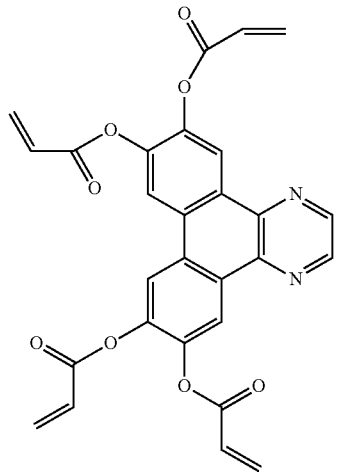

The compound of chemical formula 2 has a structure of tripenylene, and has four acrylic groups

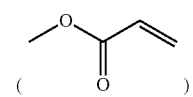

bonded to the terminal ends thereof. The polyimide compound of chemical formula 1 having the azo group and the discotic liquid crystal compound of chemical formula 2 react with each other by light. During the reaction, the acrylic groups included in the terminal ends of chemical formulas 1 and 2 react with each other to incur a radical photo-curing. As a result, a compound having chemical formula 3 as follows is formed.

<Chemical formula 3>

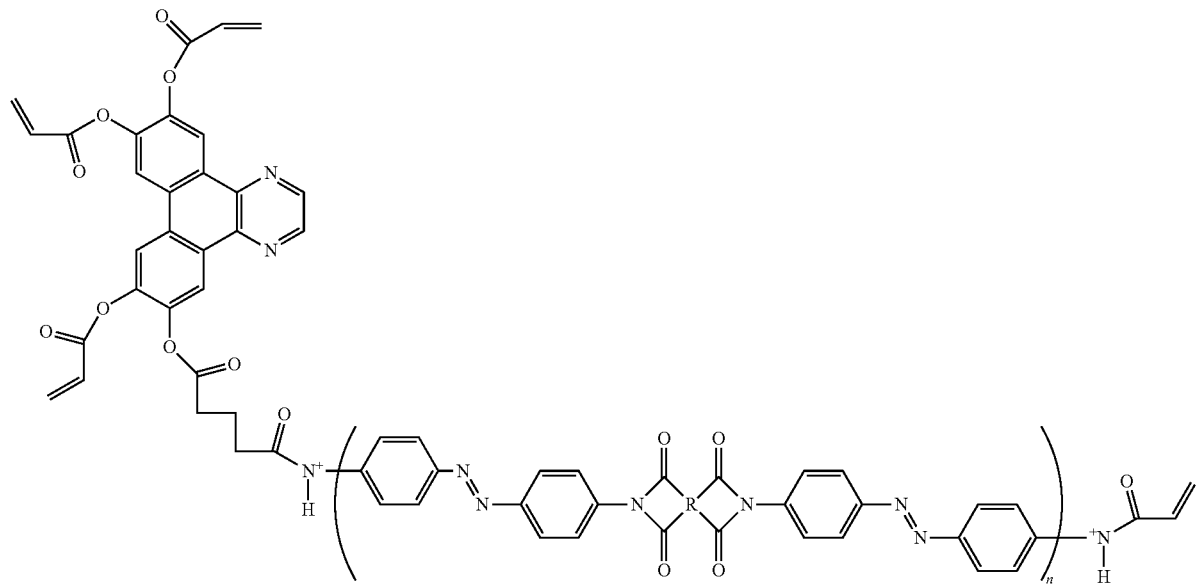

R: hydrocarbon n: positive integer

The compound of chemical formula 3 is a polyimide compound, and has the azo group at the main chain thereof to exhibit the optical alignment characteristics. In addition, the compound of chemical formula 3 has the optical anisotropy due to the discotic liquid crystal compound which is bonded to the terminal end thereof.

Meanwhile, the alignment layer 130 is derived from a polyimide compound having chemical formula 4 as follows and the discotic liquid crystal compound having chemical formula 5 as follows.

<Chemical formula 4>

<Chemical formula 5>

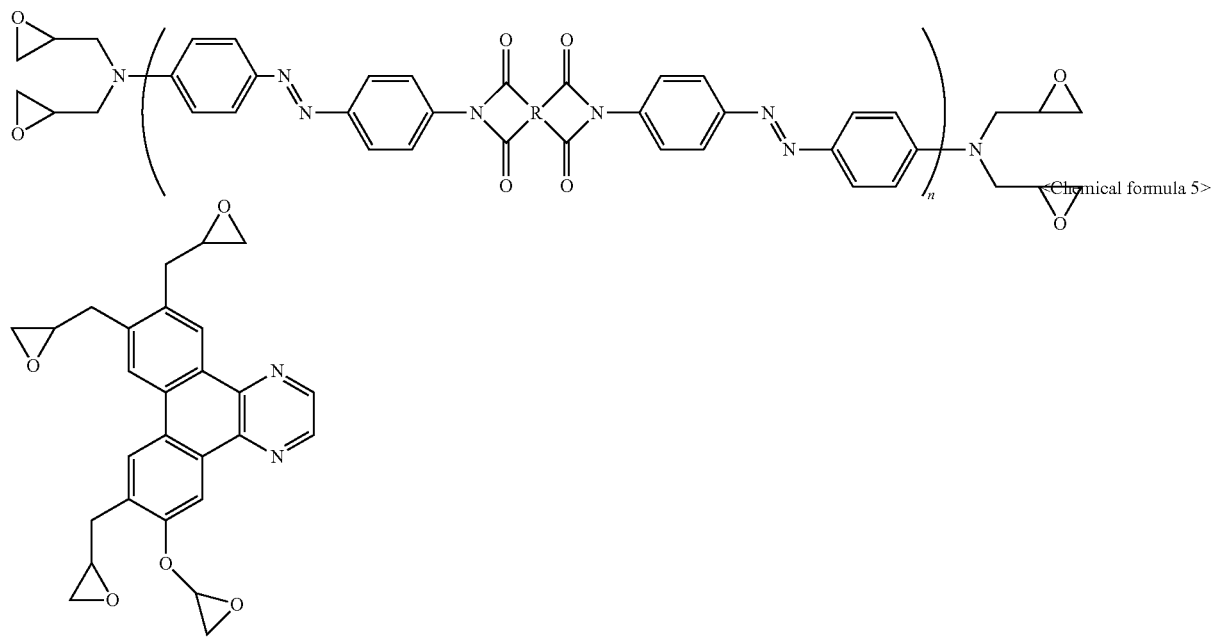

R: hydrocarbon n: positive integer

The compound of chemical formula 4 is a polymer having the imide group and the azobenzenoid bonded to both ends of the central hydrocarbon, respectively, and has epoxy groups

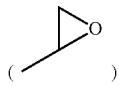

bonded to the terminal ends thereof. The compound of chemical formula 5 has a structure of tripenylene, and has four epoxy groups

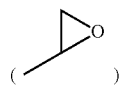

bonded to the terminal ends thereof. The polyimide compound of chemical formula 4 having the azo group and the discotic liquid crystal compound of chemical formula 5 react with each other by light.

During the reaction, the epoxy groups included in the terminal ends of chemical formulas 4 and 5 react with each other to incur a cation photo-curing. As a result, a compound having chemical formula 6 as follows is formed.

<Chemical formula 6>

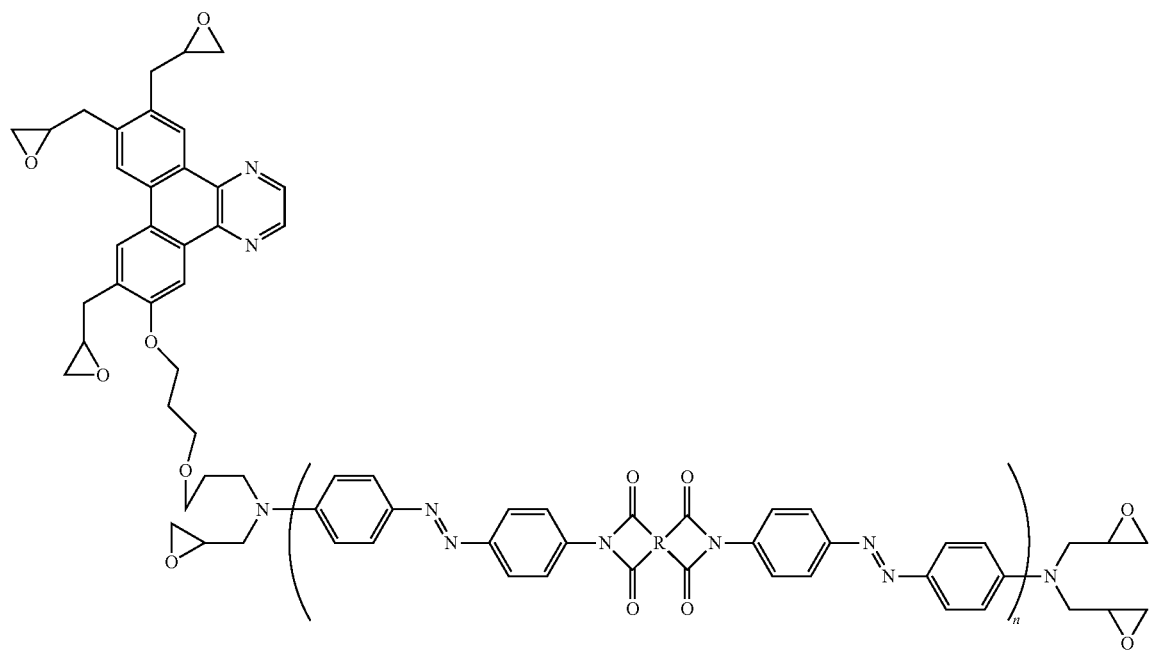

R: hydrocarbon n: positive integer

The compound of chemical formula 6 is a polyimide compound, and has the azo group at the main chain thereof to exhibit the optical alignment characteristics. In addition, the compound of chemical formula 6 has the optical anisotropy due to the discotic liquid crystal compound which is bonded to the terminal end thereof.

Meanwhile, the alignment layer 130 can be formed from a polyimide compound having chemical formula 7 as follows and the discotic liquid crystal compound having chemical formula 5.

<Chemical formula 7>

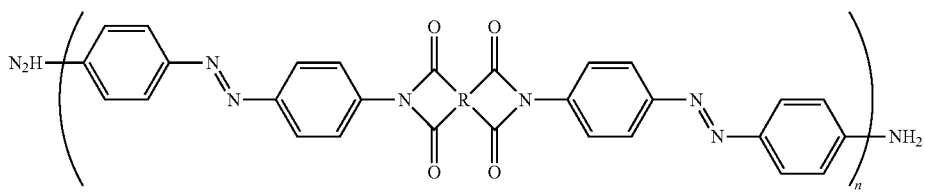

R: hydrocarbon n: positive integer

The compound of chemical formula 7 is a polymer having the imide group and the azobenzenoid bonded to both ends of the central hydrocarbon, respectively, and has amine groups (NH$_2$) bonded to the terminal ends thereof. The polyimide compound of chemical formula 7 having the azo group and the discotic liquid crystal compound of chemical formula 5 react with each other by heat.

During the reaction, the amine group included in the terminal end of chemical formula 7 and the epoxy group included in the terminal end of chemical formula 5 react with each other to incur a thermosetting. As a result, a compound having chemical formula 8 as follows is formed.

formula 8 have the optical anisotropy due to the discotic liquid crystal compound which is bonded to the terminal ends thereof.

As described above, the alignment layer 130 includes at least one of the compounds of chemical formula 3, 6 and 8 through the photo-curing or the thermosetting. The curing process is rapidly performed in the photo-curing, so the liquid crystal layer 140 is prevented from being contaminated by the alignment layer 130 before the curing process. However, the region where no light reaches the liquid crystal panel 100 may be non-cured during the photo-curing. In <Chemical formula 8>

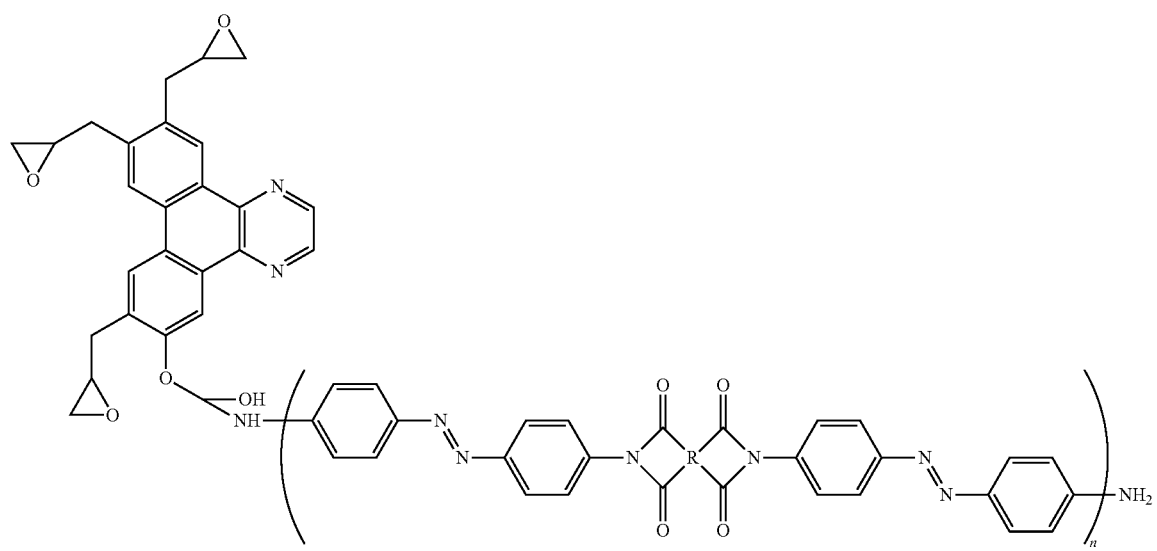

R: hydrocarbon n: positive integer

The compound of chemical formula 8 is a polyimide compound, and has the azo group at the main chain thereof to exhibit the optical alignment characteristics. In addition, the compound of chemical formula 8 has the optical anisotropy due to the discotic liquid crystal compound which is bonded to the terminal end thereof.

Meanwhile, the alignment layer 130 can be formed from a polyimide compound having chemical formulas 4 and 7 and the discotic liquid crystal compound having chemical formula 5. The compound of chemical formula 4 and the compound of chemical formula 5 react with each other by light, and as a result, the compound having chemical formula 6 is formed. The compound of chemical formula 7 and the compound of chemical formula 5 react with each other by heat, and as a result, the compound having chemical formula 8 is formed. The compound having chemical formula 6 and the compound having chemical formula 8 are polyimide compound, and both compound have the azo group at the main chain thereof to exhibit the optical alignment characteristics. In addition, the compound having chemical formulas 6 and the compound having chemical contrast, although the curing speed in the thermosetting is slow, the curing is uniformly performed throughout the liquid crystal panel 100.

Various advantages as well as improvement of the viewing angle of the liquid crystal display can be achieved during the manufacturing process for the liquid crystal display by using the alignment layer 130. Hereinafter, the various advantages will be described with reference to the process of manufacturing the liquid crystal display by using the above-mentioned alignment layer material.

Referring again to FIG. 2, the first and second substrates 110 and 120 are separately prepared.

In the first substrate 110, a gate conductive layer is formed on the first substrate 110, and then, the gate conductive layer is patterned to form the gate lines 111 and gate electrodes. After forming a data conductive layer on the gate lines 111, the data conductive layer is patterned to form the data lines 112, source electrodes and drain electrodes. The thin film transistor 115 is formed by each gate electrode, each source electrode and each drain electrode. After forming a transparent conductive layer on the data lines 112, the transparent conductive layer is patterned to form the pixel electrode 113. The first alignment layer 131 is formed on the pixel electrode 113. In the second substrate 120, the transparent conductive layer is deposited on the second substrate 120 to form the common electrode 123. The second alignment layer 132 is formed on the common electrode 123.

The compound including the polyimide compound having the azo group and the discotic liquid crystal compound is melted in appropriate solvent, thereby forming a solution. After coating the solution on the pixel electrode 113 and the common electrode 123, the solution is cured, thereby forming the first and second alignment layers 131 and 132.

Figure 5:
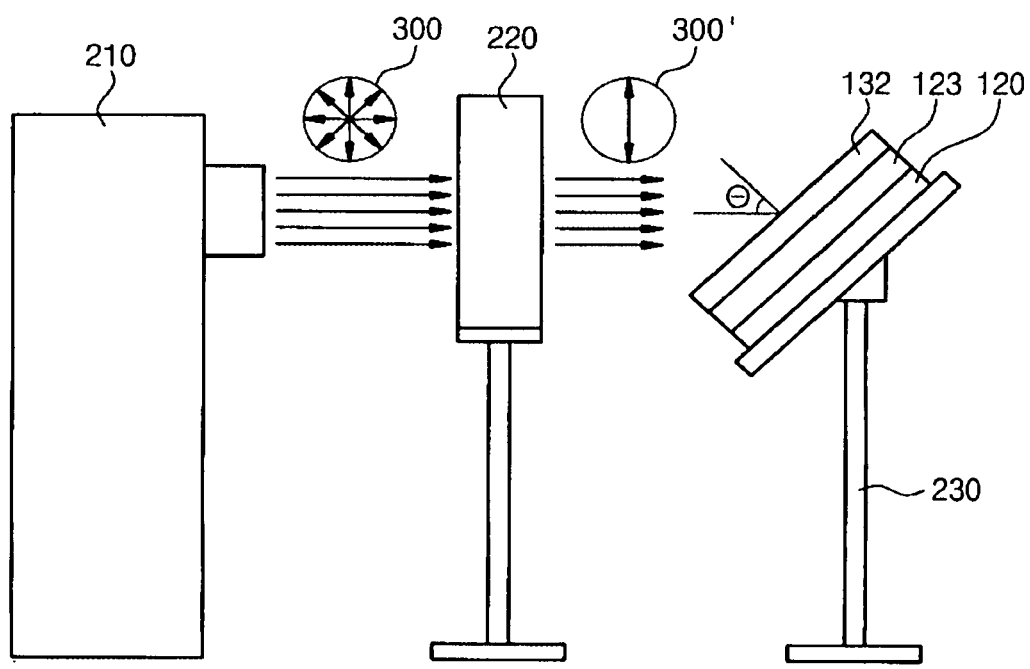
FIG. 5 is a view illustrating the process of optically aligning an alignment layer shown in FIG. 2.

FIG. 5 is a view illustrating the process of optically aligning an alignment layer shown in FIG. 2. Although FIG. 5 shows the process of optically aligning the second alignment layer 132, this can also be applicable for the first alignment layer 131.

Referring to FIG. 5, a light source 210, a polarizer 220 and a stage 230 are provided. The second substrate 120 is placed on the stage 230. Light 300 generated from the light source 210 is linearly polarized while passing through the polarizer 220. The linearly polarized light 300' is supplied to the surface of the second alignment layer 132 while having a predetermined angle (θ) inclined relative to the surface of the second alignment layer 132. The alignment direction of the liquid crystal is adjusted according to the angle (θ). For instance, when the angle (θ) is about 45 degrees, the liquid crystal can be aligned to have a pretilt angle of about 5 degrees.

As described above, the rubbing process can be performed relative to the alignment layer 130 such that the alignment layer 130 may have the alignment characteristics. That is, the alignment layer 130 is rubbed with the cloth. However, a pressure is applied to the alignment layer 130 during the rubbing process, so that the pressure may exert an influence upon the discotic liquid crystal compound included in the alignment layer 130. As a result, the discotic liquid crystal is inappropriately aligned, thereby narrowing the viewing angle of the liquid crystal display. However, such a problem can be prevented by using the optical alignment as described in the present embodiment.

According to the embodiment, the viewing angle of the liquid crystal display is widened by using the alignment layer having the optical anisotropy. In addition, the alignment characteristics can be easily imparted to the alignment layer by the light.

Although embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. An alignment layer for aligning a liquid crystal, the alignment layer comprising a first polyimide compound that includes
    a second polyimide compound having an azobenzenoid group and an imide group bound to a central hydrocarbon, and
    a discotic liquid crystal compound bonded to the second polyimide compound, wherein the discotic liquid crystal compound includes a 1,4-aza-triphenylene group.

2. The alignment layer of claim 1, wherein the second polyimide compound is represented by

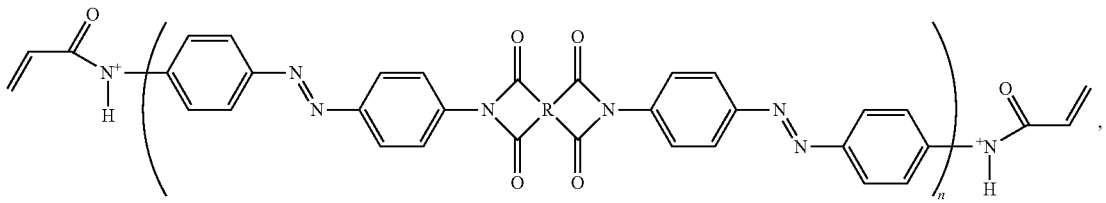

R: hydrocarbon n: positive integer and the discotic liquid crystal compound is represented by

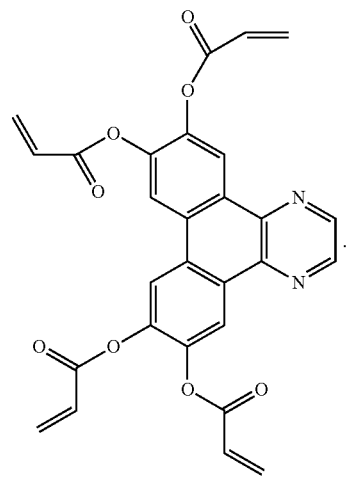 [SMILES: C=CC(=O)Oc1cc2c3cc(OC(=O)C=C)c(OC(=O)C=C)cc3c3nccnc3c2cc1OC(=O)C=C]

3. The alignment layer of claim 2, wherein the first polyimide compound has a chemical formula as follows:

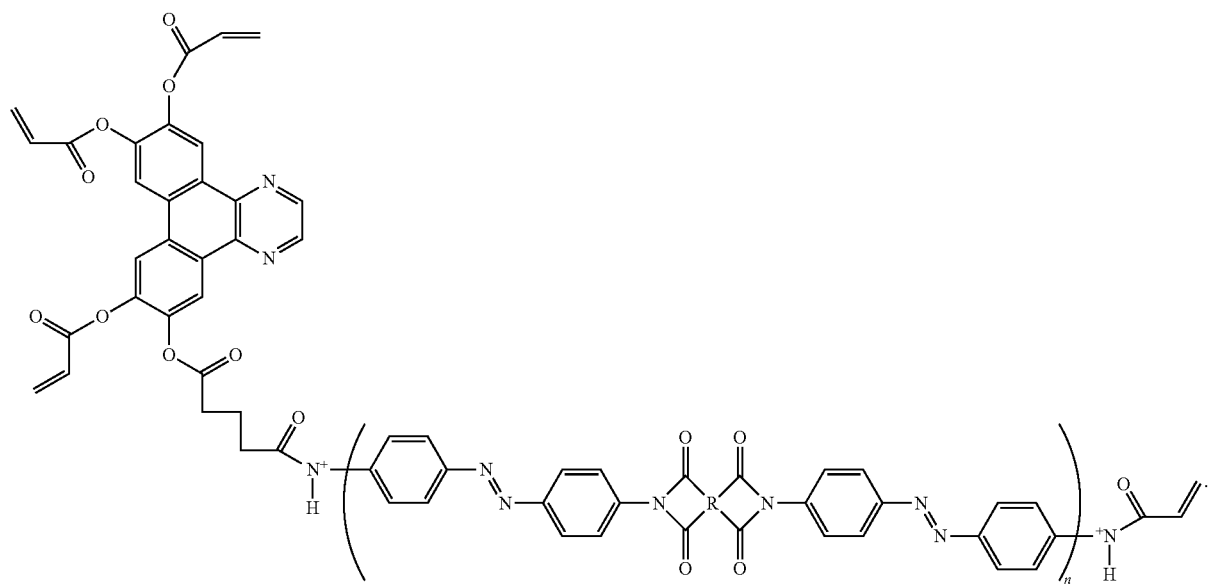
R: hydrocarbon n: positive integer
4. The alignment layer of claim 1, wherein the second polyimide compound is represented by
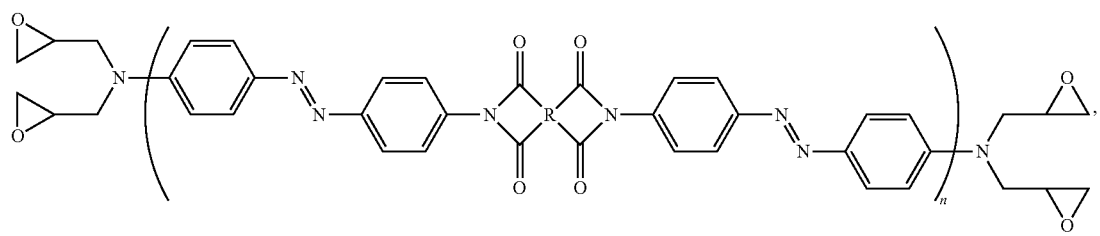
R: hydrocarbon n: positive integer
and the discotic liquid crystal compound is represented by
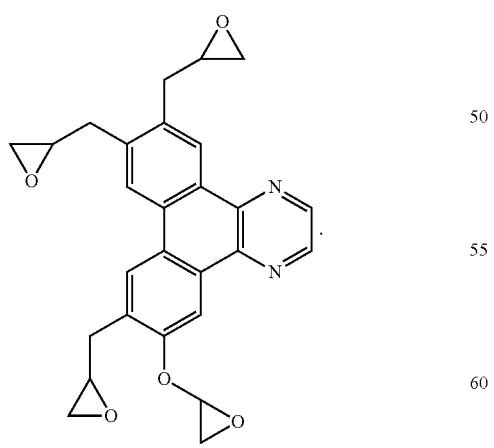
5. The alignment layer of claim 4, wherein the first polyimide compound has a chemical formula as follows:

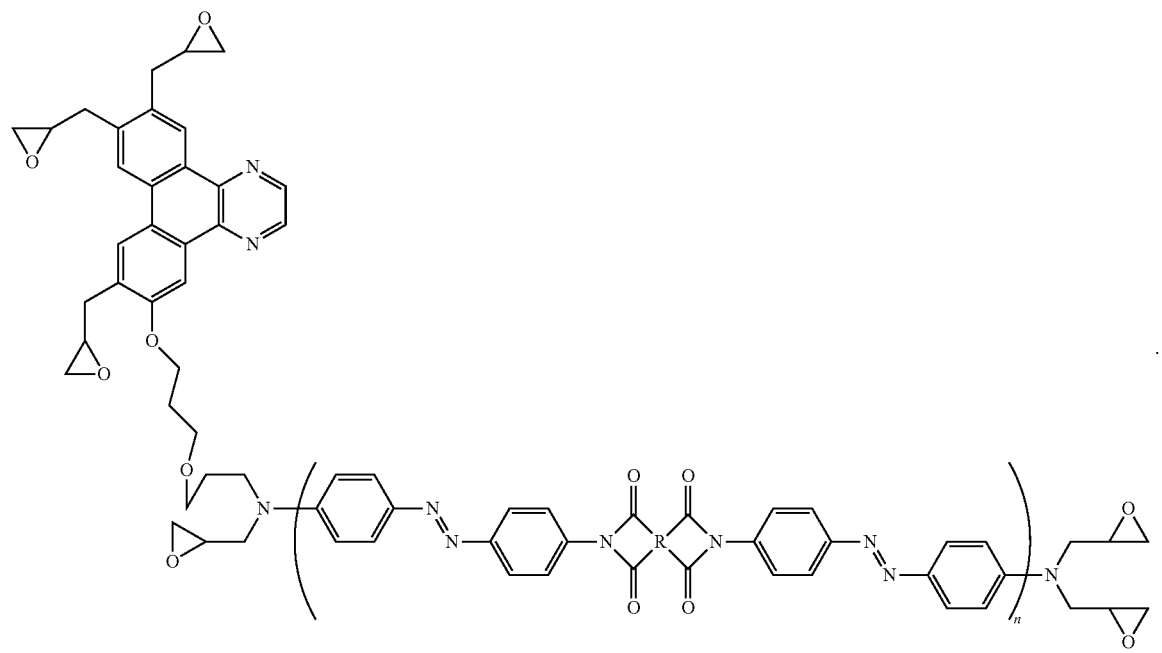
R: hydrocarbon n: positive integer
6. The alignment layer of claim 1, wherein the second polyimide compound is represented by
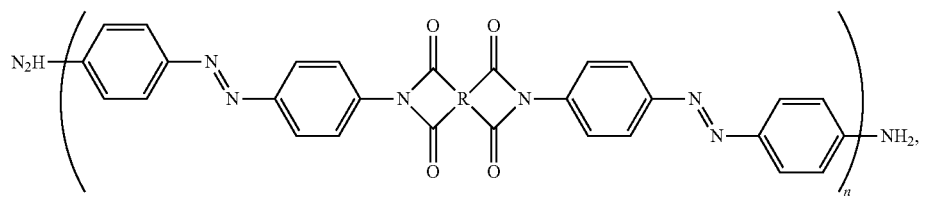
R: hydrocarbon
n: positive integer
and the discotic liquid crystal compound is represented by
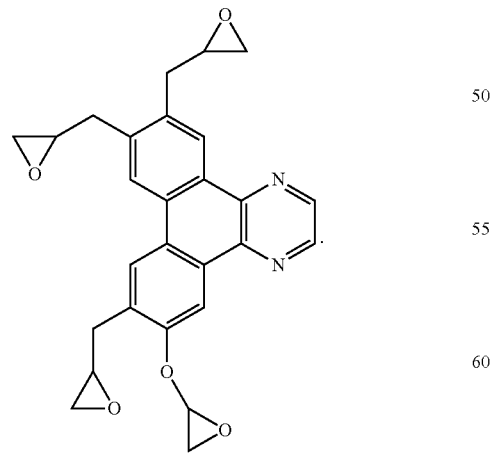
7. The alignment layer of claim 6, wherein the first polyimide compound has a chemical formula as follows:

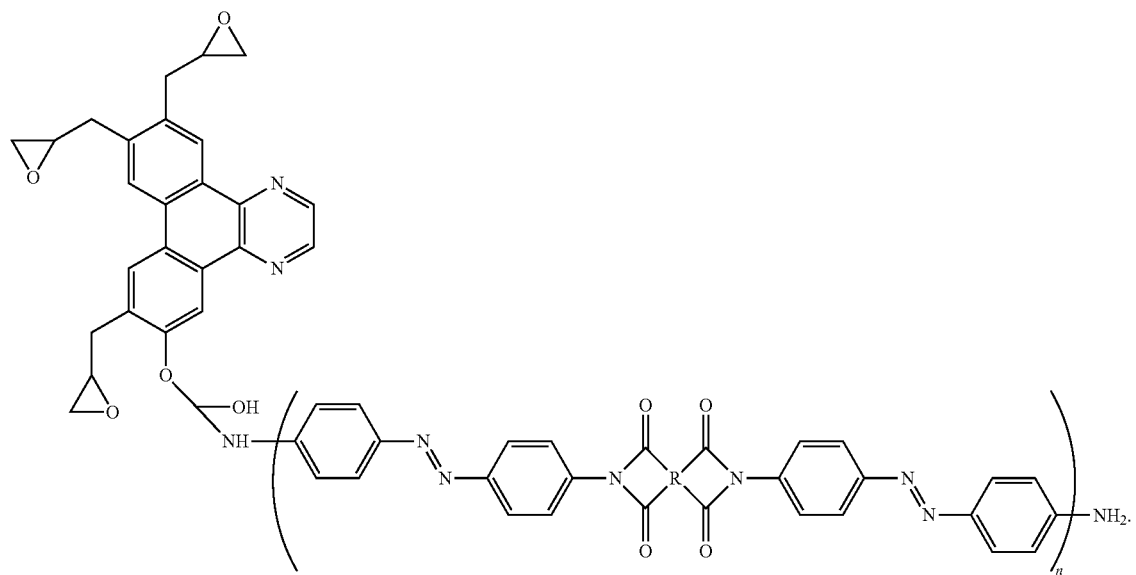
R: hydrocarbon
n: positive integer
8. The alignment layer of claim 1, wherein the second polyimide compound includes a compound represented by
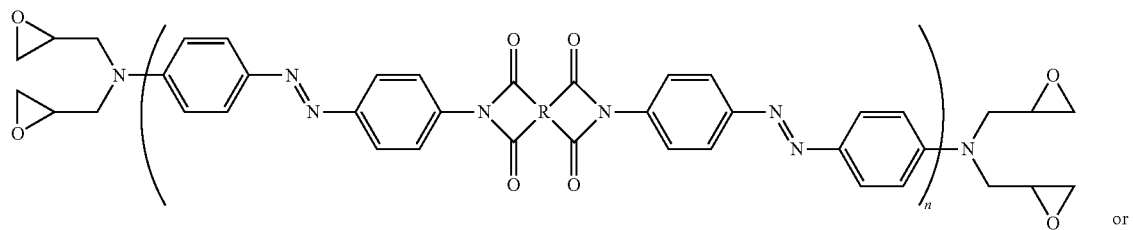
or
R: hydrocarbon
n: positive integer
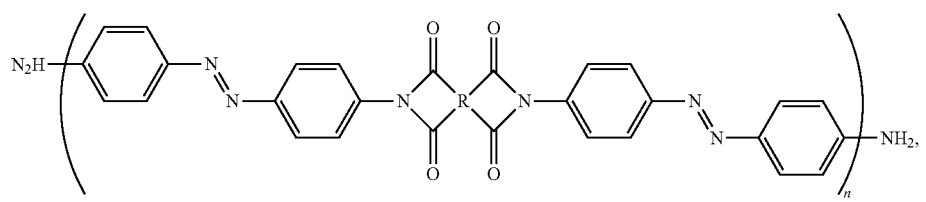
R: hydrocarbon
n: positive integer and the discotic liquid crystal compound is represented by
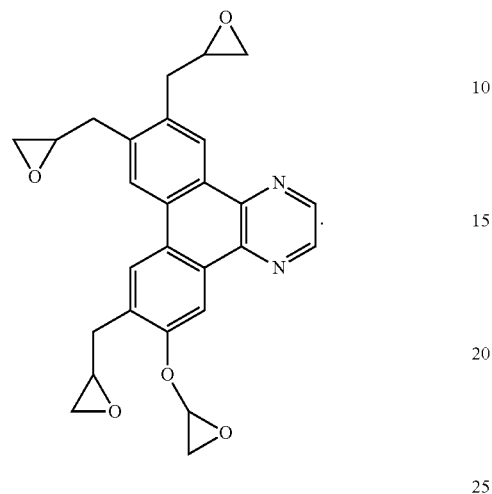
9. The alignment layer of claim 8, wherein the first polyimide compound includes a compound represented by
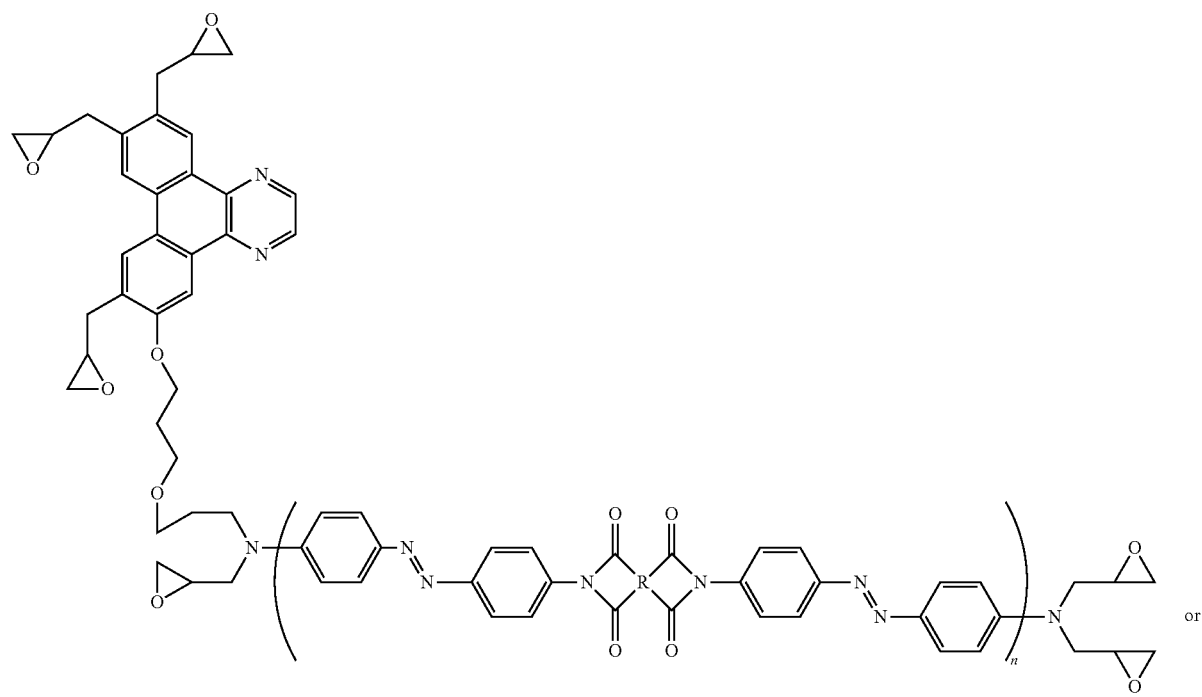
or -continued

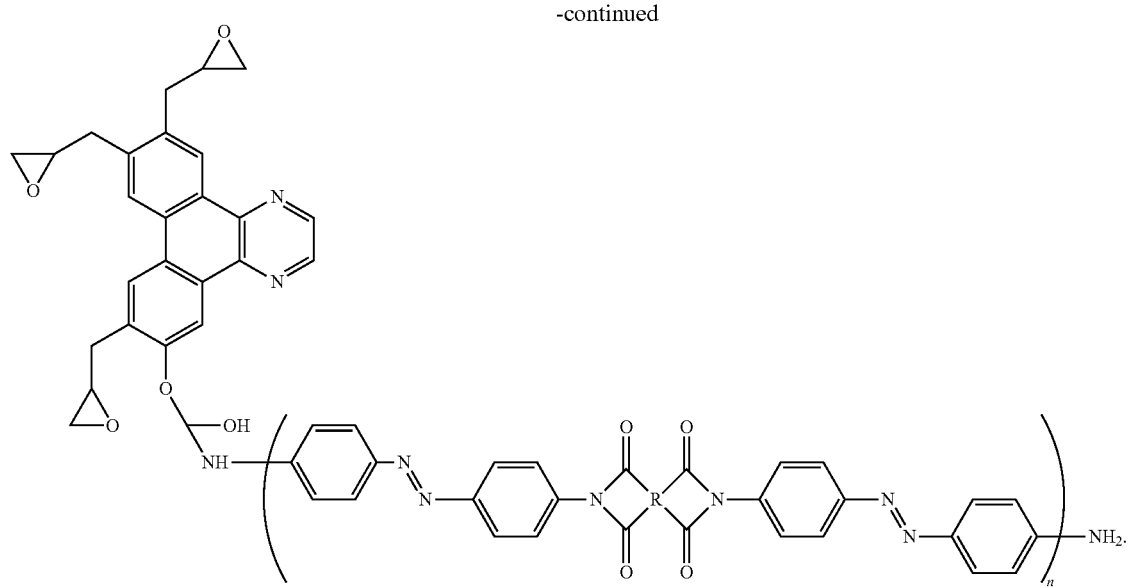

R: hydrocarbon n: positive integer

10. A liquid crystal display, comprising:
first and second substrates facing each other;
a liquid crystal aligned between the first and second substrates; and
an alignment layer formed on at least one surface of the first and second substrates to be adjacent to the liquid crystal, wherein the alignment layer comprises a first polyimide compound includes a second polyimide compound having an azobenzenoid group and an imide group bound to a central hydrocarbon, and a discotic liquid crystal compound bonded to the second polyimide compound, wherein the discotic liquid crystal compound includes a 1,4-aza-triphenylene group.

11. The liquid crystal display of claim 10, wherein the second polyimide compound is represented by

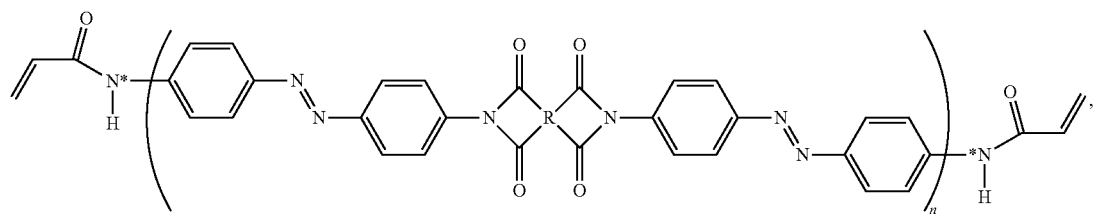

R: hydrocarbon
n: positive integer and the discotic liquid crystal compound is represented by
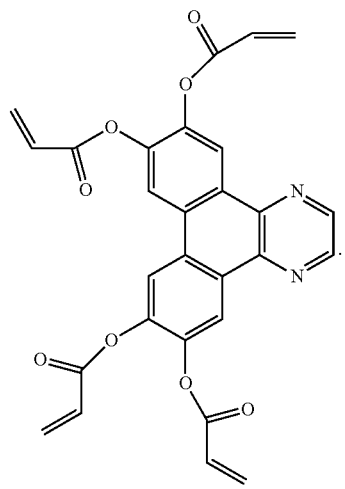 [SMILES: C=CC(=O)Oc1cc2c3cc(OC(=O)C=C)c(OC(=O)C=C)cc3c3nccnc3c2cc1OC(=O)C=C]
12. The liquid crystal display of claim 11, wherein the first polyimide compound has a chemical formula as follows:
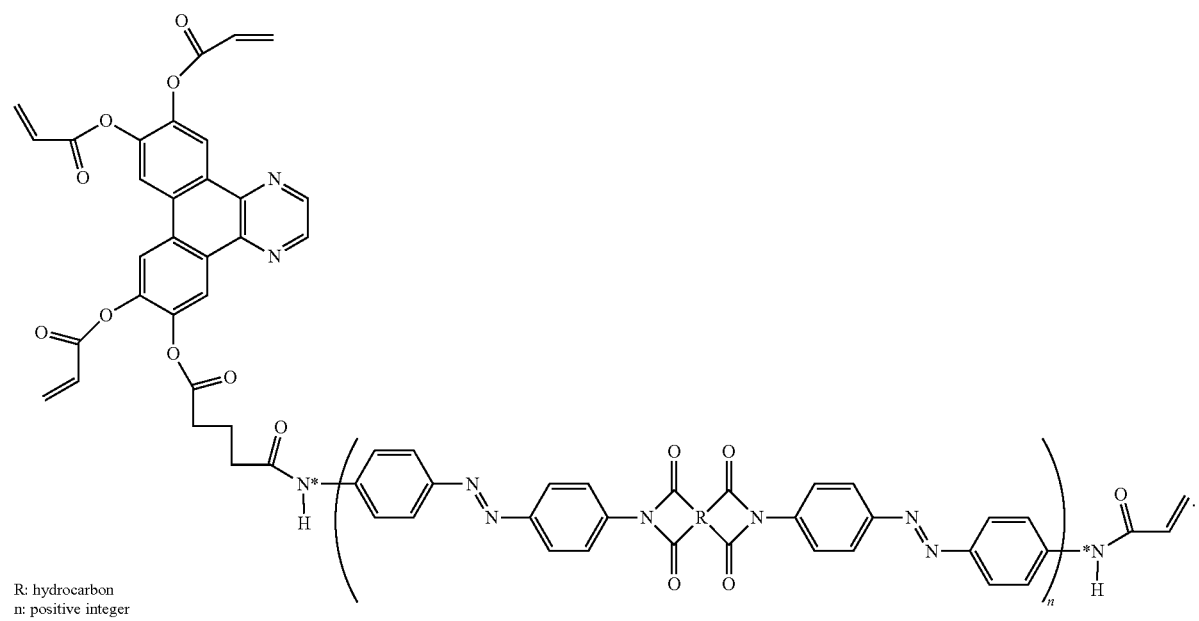
R: hydrocarbon
n: positive integer
13. The liquid crystal display of claim 10, wherein the second polyimide compound is represented by
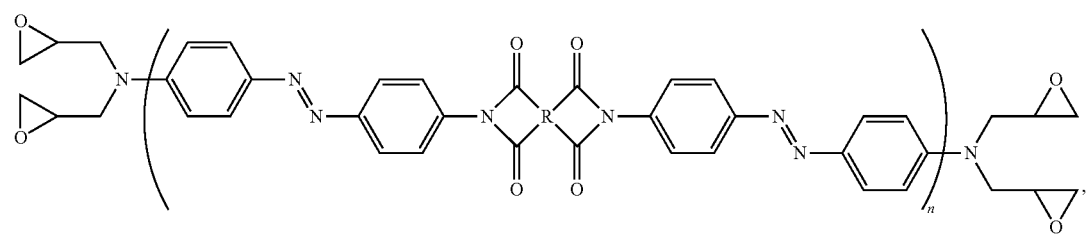
R: hydrocarbon
n: positive integer and the discotic liquid crystal compound is represented by
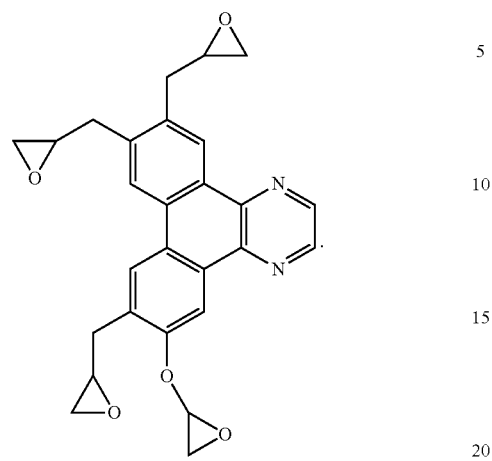
14. The liquid crystal display of claim 13, wherein the first polyimide compound has a chemical formula as follows:
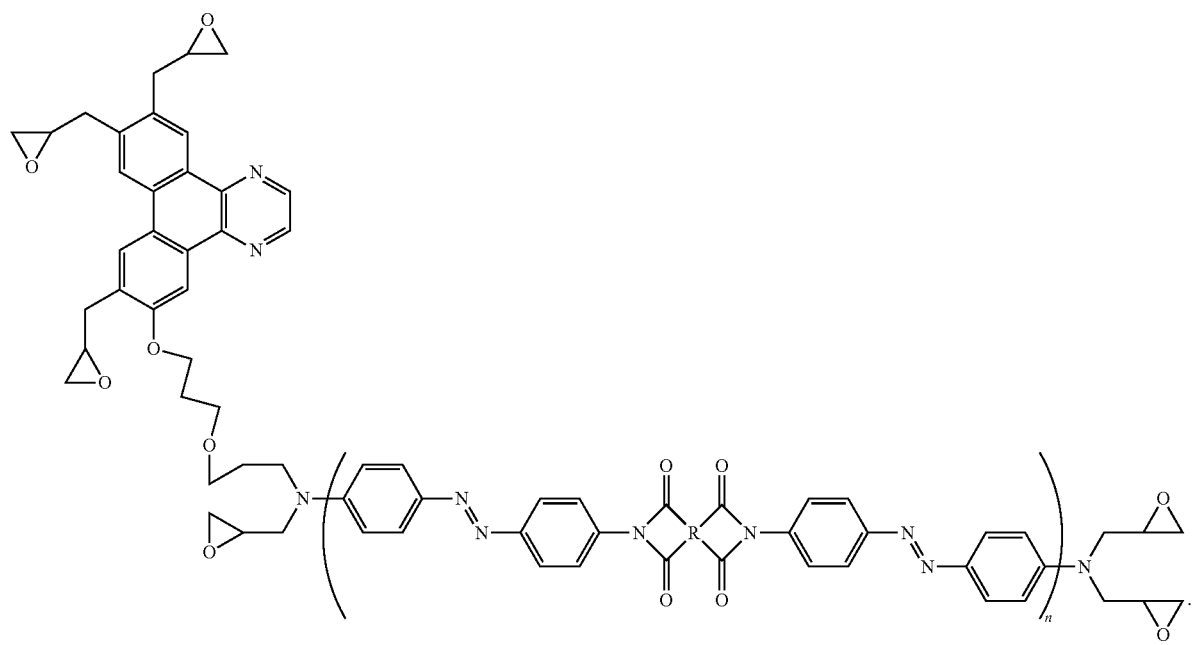
R: hydrocarbon
n: positive integer
15. The liquid crystal display of claim 10, wherein the second polyimide compound is represented by
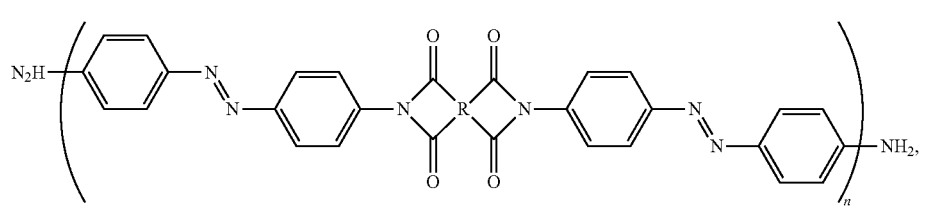
R: hydrocarbon
n: positive integer and the discotic liquid crystal compound is represented by
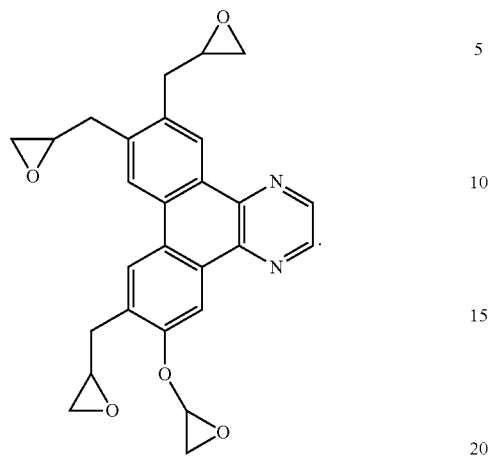
16. The liquid crystal display of claim 15, wherein the first polyimide compound has a chemical formula as follows:
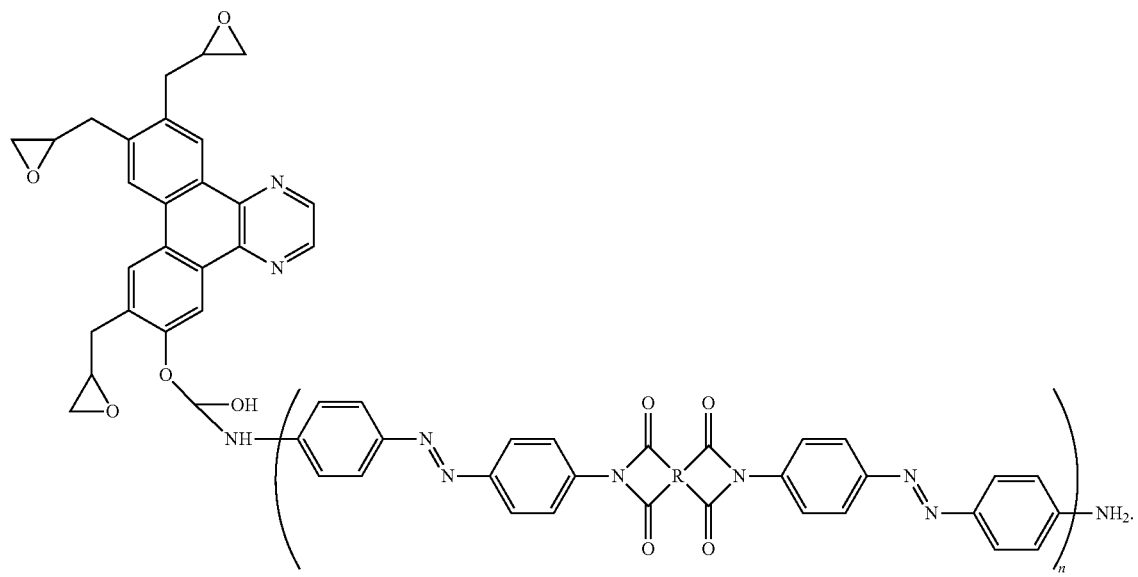
R: hydrocarbon
n: positive integer
17. The liquid crystal display of claim 10, wherein the second polyimide compound is represented by
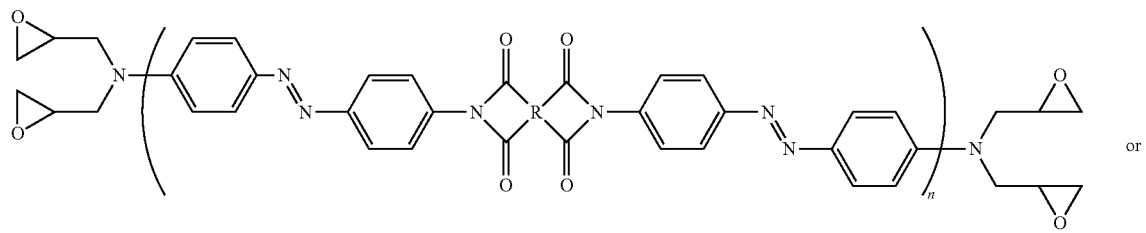
or -continued
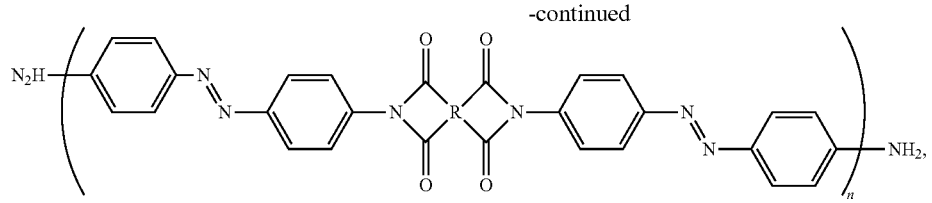
R: hydrocarbon n: positive integer
and the discotic liquid crystal compound is represented by
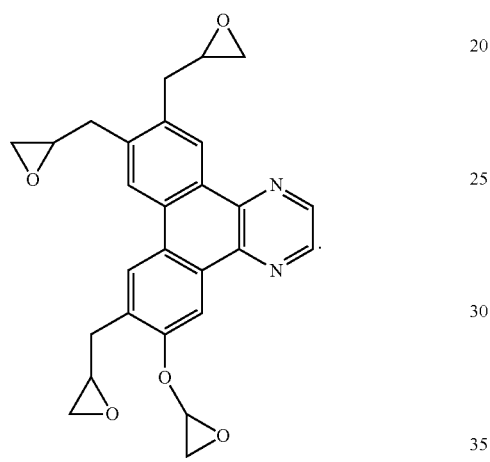
18. The liquid crystal display of claim 17, wherein the first polyimide compound includes a compound represented by
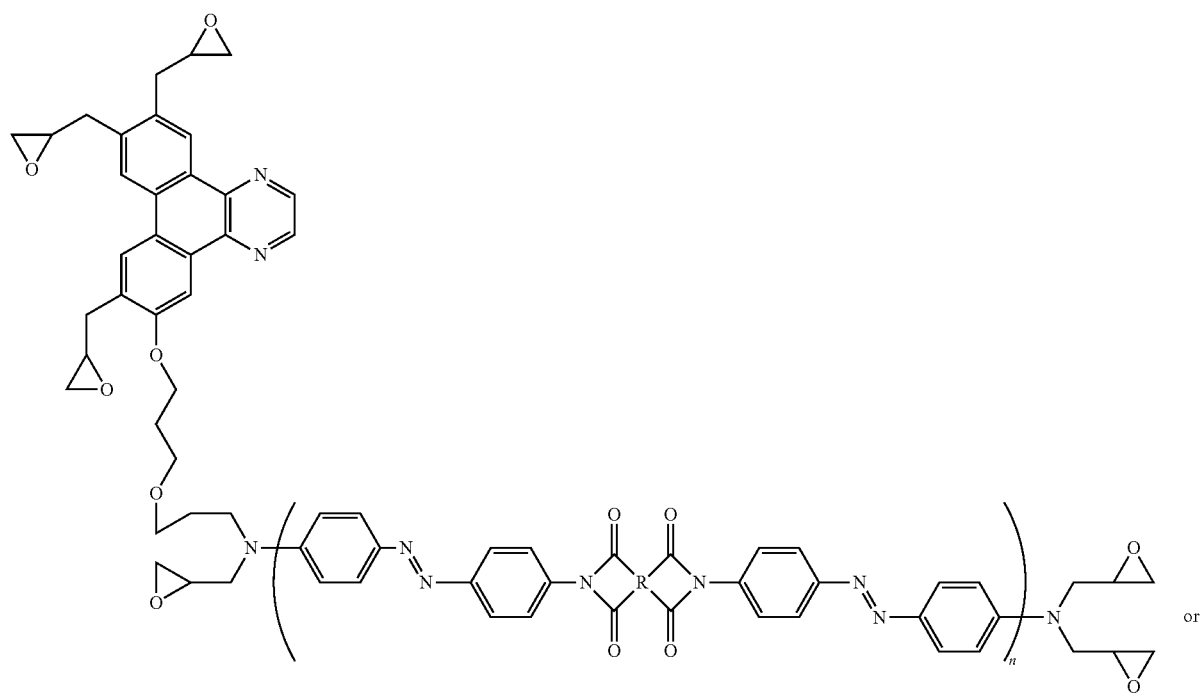
or -continued

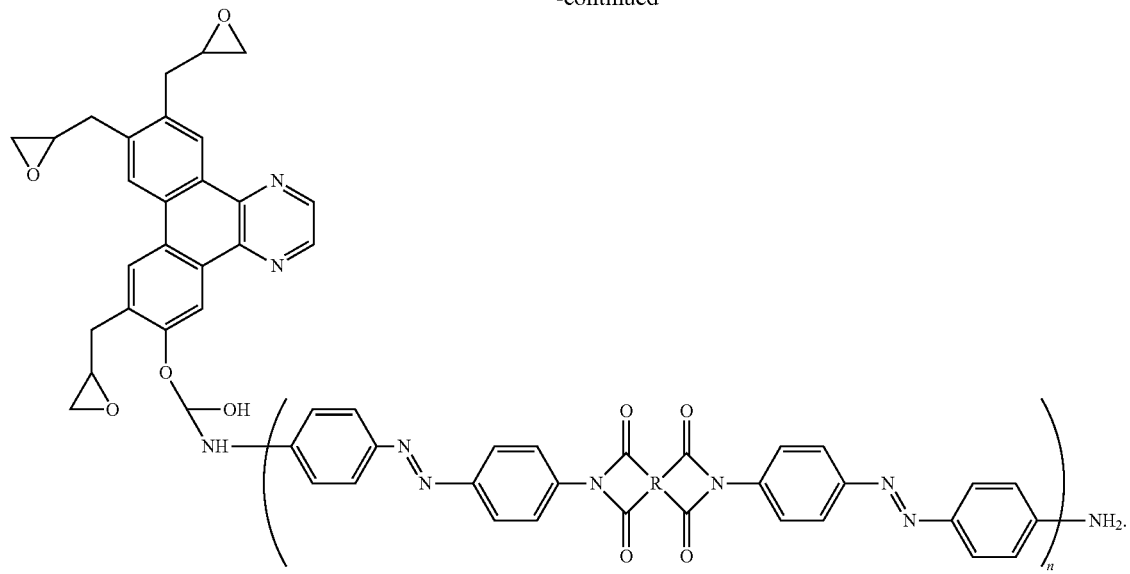

R: hydrocarbon n: positive integer

19. The liquid crystal display of claim 10, wherein the alignment layer is supplied by a linearly polarized light which is inclined relative to the alignment layer to exhibit the optical alignment characteristics.

20. The liquid crystal display of claim 10, wherein the liquid crystal includes a nematic liquid crystal having a twisted degree, wherein the alignment layer includes a first alignment layer disposed on the first substrate and a second alignment layer disposed on the second substrate, wherein the first alignment layer and the second alignment layer have the first polyimide compound, and wherein the discotic liquid crystal of the first alignment layer is aligned corresponding to the twisted degree of the nematic liquid crystal adjacent to the first substrate, and the discotic liquid crystal of the second alignment layer is aligned corresponding to the twisted degree of the nematic liquid crystal adjacent to the second substrate.

* * * * *